United States Patent Office 2,930,776
Patented Mar. 29, 1960

2,930,776

COMPOSITION COMPRISING UNSATURATED POLYESTER AND AN UNSATURATED ESTER

Lennart A. Lundberg, Stamford, Conn., assignor to American Cyanamid Company, New York, N.Y., a corporation of Maine No Drawing. Application January 2, 1957
Serial No. 632,031

17 Claims. (Cl. 260—45.4)

This invention relates to certain copolymerizable mixtures of unsaturated halogenated cyanurates or isocyanurates with unsaturated polyesters and the polymerization products thereof.

Thermosetting unsaturated polyester resins, in general, have stability against only a limited number of influences of a deleterious nature. Frequently when one of these resins is modified to build up its stability against one factor, there is a loss in resistance against one or more other factors which are also encountered. For example, flame resistant polyester resin compositions, especially those containing chlorine or other halogens, usually have poor stability to ultraviolet light, that is they readily discolor upon prolonged exposure to intense sunlight. Although widely used, general purpose resins show poor resistance to aging at elevated temperatures. On the other hand, resins noted for having good retention of flexural strength upon prolonged heat aging often display one or more undesirable characteristics as to flammability, excessive brittleness, cracking and crazing excessively on the surface, or in shrinking excessively as they cure. Also some of these plastic materials are subject to such violent exothermic reactions during polymerization reactions that spontaneous combustion occurs. Accordingly, it is not strange that there is continuing demand for new polyester resin compositions and especially those which demonstrate improved resistance to severe conditions of usage.

An object of the invention is to provide new thermosetting resinous compositions.

Another object of the invention is to provide new copolymers.

A further object of the invention is to provide improved flame-resistant resins.

Still another object of the invention is to provide flame-resistant resins having improved stability to other deleterious influences.

A still further object of the invention is to provide improved resins having balanced resistance to heat, flame, crazing, shrinkage and ultraviolet light.

Other objects and advantages of the invention will be apparent to those skilled in the art upon consideration of the detailed disclosures hereinbelow.

The present invention comprises the copolymeric products of as well as polymerizable mixtures of one or more unsaturated linear polyesters, polyhydric alcohols and alpha-beta ethylenically unsaturated polycarboxylic acid with one or more copolymerizable halogenated esters, which esters in their monomeric form prior to halogenation are organic esters of cyanuric and isocyanuric acids with at least 2 alkenyl radicals of the group consisting of allyl and methallyl radicals. The halogenated triallyl cyanurate and halogenated diallyl monoalkyl cyanurates having 1 to 22 carbon atoms in the alkyl group appear to have the widest utility. Although chlorinated and brominated esters are preferred, the novel resin mixtures may contain unsaturated iodine or fluorine esters of the designated class.

A few of the many suitable new halogenated unsaturated esters are chlorinated trimethallyl cyanurate, brominated triallyl isocyanurate, iodated trimethallyl isocyanurate, fluorinated triallyl cyanurate, chlorinated 2-amino-4,6-dialloxy-1,3,5-triazine, brominated diallyl methallyl cyanurate, chlorinated 2-butylamino-4,6-dimethalloxy-1,3,5-triazine, chlorinated methyl allyl methallyl isocyanurate, brominated 2 - ethylamino - 4,6 - dimethalloxy-1,3,5-triazine, brominated -2- hydroxy -4,6- dialloxy-1,3,5-triazine, brominated -2- ethoxy - 4,6 - dimethalloxy-1,3,5-triazine, chlorinated diallyl octyl cyanurate, brominated diallyl lauryl cyanurate, chlorinated diallyl octadecyl cyanurate, etc. These esters are generally present as mixtures rather than as single compounds by reason of the preparatory methods involved.

The preparation of the unhalogenated unsaturated cyanuric and isocyanuric acid esters is known in the art and accordingly need not be detailed here. Halogenation of these is accomplished by contacting the liquid unsaturated ester with a gaseous, liquid or solid halogen while employing some form of cooling to control the reaction temperature. This is desirably followed by the application of a vacuum to the crude product to remove volatiles which might cause blistering in polymerization. It is necessary that the esters retain some degree of unsaturation in order that they may be effective cross-linking agents for the unsaturated alkyd component, and this should generally amount to about 0.75 to about 2.5 double bonds per monomeric cyanurate or isocyanurate ring. Accordingly, the quantity of combined halogen is preferably of the order of about 0.5 to about 2.25 mols of combined halogen per monomer unit. The reaction temperature is desirably between about 0° C. and about 55° C. It appears that higher temperatures promote the formation of polymers in the product. Nevertheless, some polymeric material is always present in the product of the halogenation reaction. These polymers are customarily of a rather low order such as dimers, trimers, etc. Moreover, the monomeric portion of the reaction product can be readily isolated by extraction with a suitable solvent such as hexane or petroleum ether, which does not dissolve the polymeric fraction.

The monomer has special utility in those applications where its low viscosity is necessary or desirable. These novel halogenated esters per se are disclosed and claimed in my pending application, Serial No. 631,417, filed December 31, 1956.

The alkyd components of the new resin compositions are unsaturated linear polyesters derived from a polyhydric alcohol and an olefinically or ethylenically unsaturated polycarboxylic acid, dihydric alcohols and dicarboxylic acids or anhydrides being the preferred categories.

Among the many suitable polyhydric alcohols are ethylene glycol, diethylene glycol, propylene glycol, dipropylene glycol, trimethylene glycol, tetramethylene glycol, pinacol, arabitol, xylitol, dulcitol, adonitol, mannitol, glycerol, trimethylol propane, trimethylol ethane, sorbitol, 1,1'-isopropylidene bis(p - phenylenoxy) di - 2 - propanol, pentaerythritol, dipentaerythritol, and alkanediols as exemplified by butanediol-1,2, butanediol-1,3, butanediol-1,4, pentanediol-1,2, pentanediol-1,4, pentanediol-1,5, hexanediol-1,6, and the like. It is usually desirable that a dihydric alcohol be employed in major proportion relative to any alcohols containing more than two hydroxy groups which may be used in forming the polyester.

Another essential reactant in forming the present unsaturated alkyds is a polycarboxylic acid. The expressions "polycarboxylic acids" and "dicarboxylic acids" are used herein in their broader sense to include available similarly reacting anhydrides such as maleic and phthalic anhydrides. Among the suitable alpha, beta-ethylenically unsaturated acids are maleic, fumaric, aconitic, itaconic, citraconic, mesaconic, chloromaleic, carbic, etc., acids, and mixtures thereof. Substantial amounts of acids free of non-benzenoid unsaturation may also be used, but the alpha, beta-ethylenically unsaturated acids should be present in an amount approximating at least 5% by weight of the total weight of the polycarboxylic acids used. Frequently the olefinic or ethylenically unsaturated acids amount is between about 25% and 65% by weight on the same basis. Examples of polycarboxylic acids free of non-benzenoid unsaturation include phthalic, oxalic, malonic, succinic, glutaric, sebacic, adipic, pimelic, suberic, azelaic, tricarballylic, citric, tartaric and malic acids, and mixtures thereof.

In the preparation of the polymerizable unsaturated polyesters, one may use the polyhydric alcohols and the polycarboxylic acids in substantially equimolar proportions; but an excess of the alcohol approximating 10 or 15% above the stoichiometric quantity required for complete esterification of the acid is preferred. Where a polyhydric alcohol containing more than two hydroxy groups or a polycarboxylic acid having more than two carboxyl groups is used, the proportions of reactants should be adjusted accordingly to provide for esterification of these additional reactive groups. The alcohol and acid should be reacted sufficiently to produce an ultimate polyester resinous material having an acid number not greater than about 55 and usually an acid number from about 35 to about 40 for most purposes.

The well-known thermosetting unsaturated polyester resins and their preparation are disclosed in detail in U.S. Patents Nos. 2,255,313, 2,632,751 and 2,443,735 to 2,-443,741, inclusive, which are incorporated herein by reference with the exception that some of the cross-linking monomers named there are not suitable for use here. The unsaturated polyester content of the new compositions may range from about 20 to about 80% of the total weight of copolymerizable material depending on the particular qualities desired in the final resin. For the majority of purposes, it is recommended that about 60 to about 40 parts by weight of the unsaturated alkyd resin be dissolved in 40 to 60 parts of the polymerizable unsaturated halogenated ester. The greater the contact of the latter, the greater the flame resistance of the final cured resin.

There are a number of surprising effects and unpredictable advantages which are obtained with the novel compositions. One would ordinarily believe that the substantial halogen content introduced with the cross-linking esters of cyanuric and isocyanuric acids would produce a number of quite undesirable effects including rendering the copolymeric resins extremely sensitive to discoloration by ultraviolet light and impossible to stabilize with the usual ultraviolet absorbing agents. In actual fact, the opposite is true. Contrary to expectations, the combined halogen here is unusually stable unlike past experience with polyesters, a notable example being alkyds prepared with tetrachlorophthalic anhydride. A high degree of flame resistance is obtained as indicated by an extremely low burning rate when samples of the new resins are held against an incandescent bar maintained at about 950° C. and also by the self-extinguishing characteristics displayed as soon as that bar is removed. Heat resistant, but not flame resistant, resins have been formulated in the past using unsubstituted triallyl cyanurate to cross-link unsaturated alkyd components but with a distinct sacrifice in a number of other properties. Also, the new chlorinated materials produce certain advantages upon copolymerization. Most important of these are lower exotherm, lower shrinkage and significantly reduced surface crazing when one contrasts the novel chlorinated triallyl cyanurate-alkyd copolymers with the same alkyd cross-linked with polytriallyl cyanurate; and it must be remembered that the latter is also quite combustible. Further, it is surprising that these polymers have the same resistance to degradation upon aging at 500° F. despite the very substantial reduction in unsaturation in the chlorinated cyanurate employed. Also, the color of the novel hardened resins is distinctly and desirably lighter than their counterpart polyesters which are cross-linked with unhalogenated allyl cyanuric esters.

The good physical properties of the new resinous compositions endow them with broad utility in many fields including use as coating and film-forming materials, adhesives, binding agents, impregnating agents, molding compositions, laminating and casting resins and in reinforced plastic articles such as corrugated and flat structural panels.

The conventional additives of the prior polyester resin art may be used with the novel resins and generally it is recommended that they be employed in the usual quantities. Many of these are disclosed in the aforementioned U.S. patents and thus need not be set forth here in detail except to mention that such additives include promoters for use in conjunction with a catalyst to induce gelation or at least partial curing at room temperature or even lower as exemplified by cobalt naphthenate as well as benzamidine hydrochloride or ethylene guanadine hydrochloride, either alone or in combination with a mercaptan such as lauryl mercaptan; mold lubricants such as zinc stearate and glyceryl monostearate; additional fire-retardant agents including compounds containing phosphorus; fillers and reinforcements like asbestos, glass fibers, alpha cellulose, clay, chopped textile fabrics, etc.; inhibitors like hydroquinone to stabilize against premature gelation; colorants such as compatible dyes and pigments; and plasticizers.

As an optional ingredient of the new resin formulations, an ultraviolet light absorbing agent may be included in an amount ranging from about 0.05 to about 3.0% or more based on the total weight of polymerizable matter, 0.2 to 1.0% being preferred, to eliminate or minimize yellowing in the case of light-transmitting or light-colored products. This additive is, of course, unnecessary for dark resin formulations. The class of hydroxylated benzophenones, including those containing other substituents, is especially recommended since this group of compounds does not undergo any color change upon absorbing ultraviolet radiation. A few of the many suitable agents are 2,2'-dihydroxy-4-methoxybenzophenone, 2,2'-dihydroxy-4, 4'-dimethoxybenzophenone, 2-hydroxy-4-methoxybenzophenone, 2-hydroxy-4'-methoxybenzophenone, 2-hydroxy-4,4'-dimethoxybenzophenone, 2,4 - dihydroxybenzophenone, 2-hydroxy-5-salicylybenzophenone, and like compounds.

The presence of a catalyst is usually desirable to effect the polymerization of the novel unsaturated resins. Catalysts of the well-known peroxide class are preferred. The amount of the catalyst employed may vary over rather wide limits to give varying catalyzed stability. Thus, from about 0.1% to about 10% by weight, based on the total weight of the polymerizable composition, may be used. Preferably, from about 0.2 to about 2% by weight of the catalyst, based on the total weight of the polymerizable resinous composition, gives the desired results. A faster rate of cure usually results from increasing the catalyst content within the aforementioned limits. A few examples of the many suitable organic peroxide catalysts are benzoyl peroxide, succinyl peroxide, acetyl peroxide, methyl ethyl ketone peroxide, ditertiary butyl peroxide, cumene hydroperoxide, tertiary butyl hydroperoxide, cyclohexanone peroxide, perbenzoic acid, peracetic acid, anisoyl peroxide, toluyl peroxide, p-bromobenzoyl peroxide, tertiary butyl perbenzoate, p-menthane hydroperoxide, pinane hydroperoxide, diisopropylbenzene hydroperoxide, tetiary butyl peracetate, 1-cyclohexanol-1-hydroperoxide, furoyl peroxide and chloracetyl peroxide or any organic ozonide, such as diisopropylene ozonide, diisobutylene ozonide or a mixture of such substances may be used as the curing catalyst. Other free radical type polymerization catalysts that may also be used are such as α,α-azodiisobutyronitrile, the salts of inorganic peracids, e.g., ammonium persulfate, sodium persulfate and the like.

Curing of any of the new liquid resin compositions may be accomplished with or without added pressure in the atmosphere or in closed molds at temperatures ranging from about 10° C. up to 150° C. or even higher temperatures as long as they are kept below the point at which resin degradation commences. Where convenient, it is often desirable to form the copolymers by heating the catalyzed resin-forming mass to between 90 and about 120° C. for a period of about 10 to 90 minutes to expedite production.

While gelation and sometimes curing may be accomplished at relatively low temperatures of the order of room temperature, post-curing is often highly desirable to impart optimum physical properties especially in respect to retention of flexural strength under prolonged heat aging. This may be accomplished by further heating of the cured article after curing to the temperature range of about 250° F. to about 500° F. either uniformly or in a graduated series of steps over a period occupying about 6 hours. This post-curing is usually performed, with the article in an oven, and pressure or clamping are not necessary.

Although the halogenated ester components of the novel resins are not compatible with all other cross-linking substances, they may be used in conjunction with certain compatible unsaturated cross-linking agents including methyl acrylate, ethyl acrylate, methyl methacrylate, ethyl methacrylate, and a wide variety of other acrylates such as isobutyl acrylate, dodecyl acrylate, 2-chloroethyl acrylate, cyclohexyl acrylate and the corresponding methacrylate esters; allyl compounds, in general, such as diallyl phthalate, tetrachlorodiallyl phthalate, allyl alcohol, methallyl alcohol, allyl acetate, allyl methacrylate, diallyl carbonate, allyl lactate, allyl alphahydroxy isobutyrate, allyl trichlorosilane, allyl acrylate, diallyl malonate, diallyl oxalate, diallyl gluconate, diallyl methylgluconate, diallyl adipate, diallyl sebacate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl citrate, triallyl cyanurate, diallyl ethyl isocyanurate, triallyl phosphate, trimethallyl phosphate, tetraalyl silane, tetraallyl silicate, hexallyl disiloxane, and the like. It will of course be understood that these compounds modify the characteristics of the cured resins considerably and while certain advantages may be derived therefrom; nevertheless, there will be a distinct loss in certain qualities such as flame resistance and strength-retention characteristics in the aging period depending on the amount of such compounds employed. Thus, for most purposes, little or nothing is to be gained by adding an extra cross-linking agent to the resin compositions.

For a better understanding of the nature and objects of the present invention, reference should be had to the accompanying examples which are of an illustrative rather than a limiting nature and in which all proportions are expressed in terms of weight unless otherwise stated therein.

*Example 1*

A charge of 4.83 mols of triallyl cyanurate is introduced into a closed reaction vessel equipped with an agitator, a thermometer and external cooling means. With the charge subjected to constant agitation, chlorine is bubbled into the liquid over a period of 4 hours while maintaining the reaction temperature between 40 and 45° C. until a total of 5.46 mols of the gaseous chlorine is taken up. Volatile matter, mainly allyl chloride, is removed by applying a vacuum to the kettle for somewhat over 3 hours with the vacuum being applied gradually to avoid excessive frothing. A clear, pale straw-colored viscous syrup is obtained with a viscosity measured at 25° C. of 98.5–148 poise and an iodine value of 129. The chlorine content by weight is determined to be 20.88% by analysis and 20.40% by increase in weight. From these values, it is calculated that the ratio of chlorine to triallyl cyanurate in the product is 0.92:1 on a monomeric basis. The mols of unsaturation per mol of triallyl cyanurate is calculated to be 1.59 double bonds based on the iodine number and 2.08 based on the weight of chlorine absorbed. This discrepancy in residual unsaturation is thought to be due to the formation of dimers or other low order polymers. The degree of polymerization is estimated to be 24.3% from the iodine number.

A linear ethylene glycol maleate polyester is prepared by heating 1.1 mols of the glycol per mol of maleic anhydride in a closed reaction vessel at 190° C. until the acid number drops to between 30 and 35. This polyester is divided into two portions, one of which is mixed with an equal weight of unsubstituted triallyl cyanurate and the other of which is blended with an equal weight of the chlorinated triallyl cyanurate product above at a temperature of 65–70° C. The latter product is a clear viscous syrup with a viscosity of about 1,000 poises.

Each of the two resin syrups is used to laminate 12 plies of No. 181 glass cloth having a No. 301 finish with a curing cycle of 1 hour at 221° F. followed by a post-cure of 4 hours at 400° F., 2 hours at 450° F. and 3 hours at 500° F. The laminate with a 33.5% content of halogenated resin composition is found to have a somewhat higher flexural strength after eight days of exposure to 500° F. and also to have a distinctly lower rate of loss of flexural strength at this elevated temperature than the laminate which contains 36% of the polyester cross-linked with triallyl cyanurate. In addition, the novel laminate displays vastly improved flame resistance over the unchlorinated resin. Even more important is the fact that the surface of the chlorine-containing laminate is virtually unaffected by aging at elevated temperature whereas the other laminate is badly crazed.

A modified exotherm test is carried out on the two laminating resins in which a 5-gram sample is catalyzed with 0.1 gram of a paste consisting of equal weights of benzoyl peroxide and tricresyl phosphate. The halogenated cyanurate-polyester is found to have a peak exotherm of 131° C. in 20 minutes whereas the unhalogenated resin mixture reached a maximum of about 195° C. in about 8 minutes. It is apparent that the polymerization of the halogenated resin mixture is far more controllable than that of the halogen-free resin syrup.

The chlorinated and unchlorinated triallyl cyanurate-unsaturated alkyd resin syrups are mixed with 1% by weight of the above-phosphate-benzoyl peroxide mixture and then cured in glass cells from the liquid to the solid state at temperatures increased stepwise from 175 to 350° F. during a 30-hour period. The chlorinated copolymer is found to have an excellent shrinkage of only 7.6% and a Barcol hardness of 58–60, both of which values are close to those of typical commercial general purpose unsaturated polyester resin compositions containing styrene. On the other hand, the unsaturated alkyd resin cross-linked with triallyl cyanurate has an excessive shrinkage amounting to 11.1% and the 68–70 hardness of the casting on the Barcol scale denotes extreme brittleness. Upon applying a bar heated to 950° C. according to Test Method No. 7 of the American Society for Testing Materials, the halogenated resin casting is found to have a low burning rate (0.18 inch/minute) and the flames disappear upon removal of the hot bar whereas the unhalogenated resin shows a relatively high burning rate (0.90 inch/minute) and the flames continue to consume the sample after the bar is withdrawn.

Example 2

A sample of chlorinated triallyl cyanurate was prepared in the general manner of the preceding example and the chlorine content was found to be 19.5%. 103 parts of this material is mixed with 212 parts of hexane and heated to boiling. Next, the liquid mixture is allowed to separate, and the supernatant hexane layer is decanted. The remaining layer is extracted twice more in 100-part portions of the hexane in the same manner. Later after drying in a vacuum desiccator, the residue is observed to be a gummy, viscous resin. The extracts are combined and distilled under vacuum to strip off the hexane and leave 50 parts of a free-flowing light-yellow liquid product. This material is essentially monomeric chlorinated triallyl cyanurate with a chlorine content of 17.94% as determined by the sodium fusion method.

An unsaturated linear alkyd resin is made by reacting 1.1 mols of 2,2-dimethyl propanediol-1,3 and 1 mol of maleic anhydride in the manner set forth in the last example. A liquid unsaturated polyester resin composition of a thermosetting nature is formulated by intimately mixing 70 parts of this alkyd with 30 parts by weight of the monomeric chlorinated cyanuric ester. Products cast and laminated acocrding to the directions given in Example 1 are found to have the same excellent physical properties in general.

It is further observed that the viscosity of the composition is quite suitable even though the resin mixture contains a much higher proportion of the more viscous component, namely the alkyd resin.

Example 3

Chlorine is bubbled into 939 parts of triallyl cyanurate while the reaction temperature is maintained at 30–35° C. for 1.5 hours to produce a gain in the weight of the liquid amounting to 153 parts. The clear, pale-colored syrup is concentrated under vacuum with heating to a temperature eventually reaching 80–85° C. at an absolute pressure of less than 1 mm. Hg. The viscosity of the syrup is 5.5 poises at 25° C. and the iodine number is 229 while the chlorine content amounts to 12.7%. From this, the degree of polymerization was estimated as being 3.0%.

An unsaturated alkyd is prepared by condensing 2.2 mols of propylene glycol with 1 mol of each of phthalic and maleic anhydrides in the manner described in Example 1 in formulating the resin composition for application. 30 parts of this alkyd, 70 parts of the chlorinated allyl compound described immediately above, sufficient cobalt naphthenate to provide 0.016 part of cobalt as a promoter, and 0.01 part of hydroquinone as an inhibitor against premature gelation are thoroughly blended together. After prolonged storage at room temperature without any ill effects, the resin is catalyzed by the addition of 1% of a 60% solution of methyl ethyl ketone peroxide in dimethyl phthalate. Casting and laminates are prepared in the manner described earlier except that they are allowed to gel and cure overnight at room temperature without the application of any external heat. Upon postcuring these products in an oven in the manner set forth in Example 1, it is found that the laminates and castings display outstanding physical properties of the same order as the products of Example 1.

Example 4

Chlorine is passed into triallyl cyanurate for 5 hours with the temperature at 40–45° C.; then for an additional 3 hours with the temperature at 50–55° C. with a total of 560 parts of chlorine being absorbed. Next, the reaction vessel is evacuated as described above for 3 hours, and the product is heated during the final hour to 40–45° C. This vacuum stripping treatment causes a weight loss in the reaction mass of 42 parts. Assuming this weight loss to consist of allyl chloride, a by-product of the reaction, it is calculated that product contains 1.95 mols of combined chlorine per mol of triallyl cyanurate. The viscous liquid is found to have an iodine number of 44.5 centigrams of iodine per gram of sample, and the viscosity greater than 1066 poises. The mols of unsaturation per mol of triallyl cyanurate charged is calculated to be 0.68 based on the iodine number and 1.05 based on the weight of chlorine taken up. The calculated degree of polymerization based on the iodine number is 35.2% by weight. A formulation suitable for laminating and casting is prepared by mixing 60 parts by weight of the above product with 40 parts of an unsaturated linear polyester prepared in the usual manner employing 3 mols of ethylene glycol, 2 mols of fumaric acid and 1 mol of isophthalic acid. The fabricating and test procedures of Example 1 are followed here and again it is observed that the clear castings and glass reinforced laminates display excellent physical properties of substantially the same nature as products of Example 1.

Example 5

Example 4 is repeated in full with two exceptions. Trimethallyl cyanurate is substituted for triallyl cyanurate on a mol for mol basis in the halogenation reaction. A polymerizable liquid resin formulation is made up by mixing this chlorinated ester and the polyester of Example 4 in equal weights rather than the proportions used formerly. Upon repeating the fabricating and test procedures of Example 1, the laminated and cast articles are observed to display similar physical properties to the product of Example 4, particularly in regard to flame resistance and surface characteristics.

Example 6

The procedure of Example 3 is duplicated except for two alterations. One is a substitution for triallyl cyanurate of triallyl isocyanurate prepared according to Patent No. 2,536,849 in the same molar proportions. Also, this halogenated isocyanurate and the propylene glycol maleate-phthalate polyester are blended in equal weights rather than the quantities utilized in the earlier example. Castings and laminates prepared and tested according to the procedure of Example 1 display similar physical properties in general, especially in respect to flame resistance and surface characteristics, but their flexural strength at elevated temperatures is below that of chlorinated triallyl cyanurate like those of Example 1.

Example 7

Liquid bromine in the amount of 1 gram mol is added dropwise to 1 mol of triallyl cyanurate in a glass laboratory flask over a period of 1 hour with constant stirring to maintain the reaction temperature at about 25° C. The reaction mixture gradually assumes a reddish-brown color while the bromine is being added, but after all of the bromine is in, that color slowly disappears as stirring is continued. Then the reaction flask is evacuated to a pressure of only a few millimeters of mercury with gentle heating to remove the volatile matter. The resulting brominated triallyl cyanurate is a yellowish viscous liquid.

The above liquid is blended with an equal weight of a propylene glycol fumarate-phthalate polyester prepared similarly to that of Example 1 by reacting 2.2 mols of the glycol with a mol each of fumaric acid and phthalic anhydride. When catalyzed and employed for laminating glass cloth as described in Example 1, the laminate is found to be free of crazing and to have a high degree of flame resistance. In addition, it retains its flexural strength well upon prolonged aging at 500° F.

Example 8

A mixture of compounds corresponding approximately to diallyl monobutyl cyanurate is prepared by an ester-interchange reaction in which 2 mols of n-butanol is heated with 1 mol of triallyl cyanurate and about 0.025 mol of sodium methylate as a catalyst at a temperature ranging from 99° C. to 107.5° C. over a period of about 4.5 hours while about 1 equivalent of allyl alcohol is allowed to distill off into a receiver. The reaction mixture is neutralized with acetic acid and washed with water to remove soluble salts. After stripping off unreacted butyl alcohol by vacuum distillation, a clear light yellow colored syrup is obtained with an iodine value of 206.8. This corresponds to a residual unsaturation of 2.14 mols (2.14 olefinic double bonds) per mol of cyanurate ester charged, and the remaining 0.86 mol represents the combined butanol content.

Chlorine is bubbled at a rate of 500 ml./minute into 526 grams of the above butyl allyl cyanurate. The reaction flask is surrounded by an ice-water bath to maintain the reaction temperature at 35–45° C., and the addition of chlorine is continued until a total of 141 grams is taken up. A vacuum line equipped with a Dry Ice trap is attached to the reaction vessel to remove volatile matter over a period of 25 minutes as the liquid reaction mixture is gently heated to a maximum temperature of 48° C. A total of 28.7 grams of a water-white liquid, corresponding to the exact weight loss of the reaction mass, is removed from the trap and found to contain about 67% allyl chloride by means of infra red analysis. The product in the reaction mass is a yellow viscous syrup with a viscosity 27.0–36.2 poises at 25° C. For simplicity it may be called chlorinated diallyl butyl cyanurate based on the iodine number and the total percent of chlorine. For each mol of triallyl cyanurate charged, the product contains 0.86 mol of combined butanol, 0.935 allyl group and 0.85 mol of dichloro propyl group. It may also be postulated that the remaining 0.355 radical per mol of original cyanuric ester is made up of

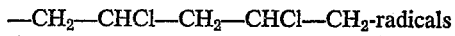
—CH$_2$—CHCl—CH$_2$—CHCl—CH$_2$-radicals linking the cyanuric acid rings in low order polymers. This would explain the high viscosity of the above product and also account for the greater theoretical or calculated degree of unsaturation based on simple beta-gamma addition of chlorine to the double bonds than the lower value based on the actual iodine value determinations.

To form a laminating syrup the chlorinated diallyl butyl cyanurate is mixed with an equal weight of the ethylene glycol maleate alkyd of Example 1 to produce solution with a viscosity of 1066 poises at 25° C. Next, 0.5% by weight of benzoyl peroxide and 0.5% of tricresyl phosphate are added to catalyze the resin. A type 181 glass cloth having a type 301 finish is immersed in the catalyzed syrup; then 12 plies of the cloth are assembled in the press and cured for 1 hour at 105° C. followed by removal from the press and postcuring in an oven for 1 hour at 250° F., 1 hour at 350° F., 1 hour at 425° F. and finally 2 hours at 500° F. in sequence. The resulting laminate has excellent surface characteristics with no indication whatsoever of crazing. In addition, it displays outstanding retention of flexural strength and modulus upon prolonged aging for 192 hours at the extremely high temperature of 500° F. In this severe test, the flexural strength is found to be 23,300 p.s.i. and the flexural modulus is calculated to be $2.3 \times 10^{-6}$. The laminate has a low burning rate in the A.S.T.M. test and proves to be self-extinguishing upon withdrawal of the heated bar.

A comparative laminate is prepared in exactly the same fashion except that the unhalogenated diallyl butyl cyanurate ester is employed giving a less viscous polyester composition (98.5–148 poise viscosity). This laminate is found to be combustible with a relatively high burning rate with no self-extinguishing qualities in the A.S.T.M. test and the flexural strength of 25,200 p.s.i. and flex modulus of $2.4 \times 10^{-6}$ indicate that halogenated component of the novel compositions provide very substantial flame retardance with only a very minor and acceptable loss in the excellent heat resistance which is obtainable with the unhalogenated cyanuric ester.

Another control laminate is made in exactly the same manner using unsubstituted triallyl cyanurate and the same ethylene glycol meleate polyester under the same conditions to obtain a laminate which not only has a slightly lower flexural strength of 21,000 p.s.i. on heat aging, but also proves to have a high burning rate and to lack self-extinguishing characteristics in the A.S.T.M. burning rate test. This laminate is observed to be of considerably darker color than that prepared with the halogenated ester.

It is surprising that the halogenated resin compositions of the present invention are able to maintain the highly desirable heat resistance so well even though unsaturation is reduced by as much as about two-thirds and meanwhile gain the important feature of flame resistance.

While there are above disclosed only a limited number of embodiments of the compositions of the present, it will be understood by those skilled in the art that many other embodiments also will fall within this inventive scope. Accordingly, it will be understood that the present invention is not limited to the details disclosed above unless expressly recited in the appended claims or required by the prior art.

I claim:

1. A composition of matter which comprises an admixture of from about 20 to 80 parts of (1) an unsaturated linear polyester of a polyhydric alcohol and an alpha, beta-ethylenically unsaturated dicarboxylic acid having an acid number less than about 55, and correspondingly from about 80 to 20 parts of (2) a halogenation product obtained by reacting a triester of an acid selected from the group consisting of cyanuric and isocyanuric, wherein the alcoholic moiety of said ester constitutes radicals selected from the group consisting of alkyl, allyl and methallyl, and wherein at least 2 of said radicals are alkenyl, with a halogen until the amount of combined halogen is from about 0.5 to 2.25 mols per mol of the ester, said halogenation product containing residual ethylenic unsaturation.

2. A composition of matter according to claim 1 in which said halogenation produce comprises halogenated triallyl cyanurate.

3. A composition of matter according to claim 1 in which said halogenation product comprises halogenated trimethallyl cyanurate.

4. A composition of matter according to claim 1 in which said halogenation product comprises halogenated triallyl isocyanurate.

5. A composition of matter according to claim 1 in which said halogenation product comprises halogenated diallyl alkyl cyanurate.

6. A compensation of matter according to cliam 1 in which said halogenation product comprises chlorinated triallyl cyanurate.

7. A composition of matter according to claim 1 in which said halogenation product comprises chlorinated trimethallyl cyanurate.

8. A composition of matter acocrding to claim 1 in which said halogenation product comprises chlorinated triallyl isocyanurate.

9. A composition of matter according to claim 1 in which said halogenation product comprises chlorinated diallyl butyl cyanurate.

10. A composition of matter according to claim 1 in which said halogenation product comprises brominated triallyl cyanurate.

11. A composition of matter which comprises an insoluble and infusible product of the polymerization of from about 20 to 80 parts of (1) an unsaturated linear polyester of a polyhydric alcohol and an alpha, beta-ethylenically unsaturated dicarboxylic acid having an acid number less than about 55, and correspondingly from about 80 to 20 parts of (2) a halogenation product obtained by reacting a triester of an acid selected from the group consisting of cyanuric and isocyanuric, wherein the alcohol moiety of said ester constitutes radicals selected from the group consisting of alkyl, allyl and methallyl, and wherein at least 2 of said radicals are alkenyl, with a halogen until the amount of combined halogen is from about 0.5 to 2.25 mols per mol of the ester said halogenation product containing residual ethylenic unsaturation.

12. A composition according to claim 11 in which said ester comprises halogenated triallyl cyanurate.

13. A composition according to claim 11 in which said ester comprises chlorinated triallyl cyanurate.

14. A composition according to claim 11 in which said ester comprises chlorinated trimethallyl cyanurate.

15. A composition according to claim 11 in which said ester comprises chlorinated triallyl isocyanurate.

16. A composition according to claim 11 in which said ester comprises chlorinated diallyl butyl cyanuarte.

17. A composition according to claim 11 in which said ester comprises brominated triallyl cyanurate.

References Cited in the file of this patent

UNITED STATES PATENTS

| | | |
|---|---|---|
| 2,510,503 | Kropa | June 6, 1950 |
| 2,537,816 | Dudley | Jan. 9, 1951 |
| 2,783,215 | Robitschek et al. | Feb. 6, 1957 |

OTHER REFERENCES

"Heat Resistant Copolymer of Triallyl Cyanurate and a Maleic Alkyd," by Paul M. Elliott, Modern Plastics, July 1952, pages 113, 114 and 185 to 187.

UNITED STATES PATENT OFFICE

CERTIFICATE OF CORRECTION

Patent No. 2,930,776

March 29, 1960

Lennart A. Lundberg

It is hereby certified that error appears in the printed specification of the above numbered patent requiring correction and that the said Letters Patent should read as corrected below.

Column 9, line 33, the formula should appear as shown below instead of as in the patent:

-- $-CH_2-CHCl-CH_2-CH_2-CHCl-CH_2-$radicals --;

column 10, line 40, for "produce" read -- product --; line 51, for "compensation" read -- composition --; same line, for "cliam" read -- claim --; line 57, for "acocrding" read -- according --; column 11, line 16, for "cyanuarte" read -- cyanurate --.

Signed and sealed this 1st day of November 1960.

(SEAL)
Attest:

KARL H. AXLINE
Attesting Officer

ROBERT C. WATSON
Commissioner of Patents